United States Patent [19]

Freudenberg et al.

[11] Patent Number: 5,085,413
[45] Date of Patent: Feb. 4, 1992

[54] RUBBER MOUNTING

[75] Inventors: Tillman Freudenberg, Weinheim; Ulrich Freudenberg, Hirschberg, both of Fed. Rep. of Germany

[73] Assignee: Firma Carl Freudenberg, Weinheim/Bergstr., Fed. Rep. of Germany

[21] Appl. No.: 473,773

[22] Filed: Feb. 2, 1990

[30] Foreign Application Priority Data

Feb. 3, 1989 [DE] Fed. Rep. of Germany ....... 3903230

[51] Int. Cl.[5] .............................................. B60G 15/04
[52] U.S. Cl. ................................ 267/140.1 A; 267/219
[58] Field of Search .............. 267/140.1 A, 140.1 R, 267/35, 219; 248/562, 636, 566; 180/300, 312

[56] References Cited

U.S. PATENT DOCUMENTS

| 4,570,911 | 2/1986 | Konishi | 267/219 |
| 4,709,779 | 12/1987 | Takehara | 180/300 |
| 4,709,898 | 12/1987 | Yoshida et al. | 267/140.1 A X |
| 4,739,962 | 4/1988 | Morita et al. | 267/140.1 A X |
| 4,836,512 | 6/1989 | Lun | 267/140.1 A X |
| 4,836,515 | 6/1989 | Franz et al. | 267/219 |
| 4,858,899 | 8/1989 | Saotome et al. | 267/219 |

FOREIGN PATENT DOCUMENTS

| 0027751 | 4/1981 | European Pat. Off. |  |
| 0297174 | 1/1989 | European Pat. Off. | 180/312 |
| 0616266 | 7/1935 | Fed. Rep. of Germany | 267/119 |
| 2727244 | 1/1978 | Fed. Rep. of Germany |  |
| 3316025 | 11/1984 | Fed. Rep. of Germany |  |
| 0076340 | 5/1982 | Japan | 267/140.1 A |
| 0220239 | 11/1985 | Japan | 267/219 |

Primary Examiner—Robert J. Oberleitner
Attorney, Agent, or Firm—Felfe & Lynch

[57] ABSTRACT

A rubber mounting which has a hydraulic damping device for damping vibrations of a predetermined frequency including a working and equalization chamber (6, 4) joined by a connecting passage (10) and filled with a hydraulic liquid. The connecting passage (10) is channel-like configured and dimensioned such that when subject to vibrations of the frequency to be damped the enclosed liquid volume can be made to resonate and such that the connecting passage (10) is narrowed to a throttle (12) only in the area of a point which is narrowly defined in axial direction.

8 Claims, 2 Drawing Sheets

RUBBER MOUNTING

The invention relates to a rubber mounting which has a hydraulic damping device for damping vibrations of a predetermined frequency.

A rubber mounting of this kind is known from German patent 33 16 025. The damping effect achieved with it is effective in a relatively broad range of low frequency vibrations, however, it is of poor quality. It is based on the utilization of the turbulence effects and viscous friction which results from pressing liquid components through the throttle. The volume of these liquid components is essentially determined by the pressure which can be generated in the working chamber. The latter is defined by the swell elasticity of the hollow-conical bearing spring made of a rubber-elastic material which partially defines the working chamber in a partial area.

It is an object of the invention to further develop a rubber mounting of the aforesaid kind such that the damping effects are substantially improved in a similarly broad range of low frequency vibrations.

In the rubber mounting according to the invention the connecting passage is configured, dimensioned and adjusted to the swell elasticity of the bearing spring such that the enclosed liquid can be made to resonate when subject to vibrations of the frequency range to be damped. This results in a damping action of particularly high quality. The calibrated throttle, however, determines that the cross section of the connecting passage of the embodiment in accordance with the invention is relatively enlarged as compared to other embodiments in which such a throttle is missing. It is believed that this is a decisive factor for the damping action to cover this surprisingly wide band.

It is generally known to make use of resonant effects with rubber mountings with hydraulic damping (EP-A-0027751). In this case, however, the connecting passage has an identical cross section over its entire length which results in a good damping action in, however, an unsatisfactory frequency range.

In the embodiments in accordance with the invention, the ratio of length and flow cross section in the connecting passage are determined similar to the prior art. Accounting for the aforesaid condition, however, the absolute value of the flow cross section is on the one side enlarged in embodiments of similar structural dimensions whereas on the other hand a rigidly configured and calibrated throttle is provided only in the area of a narrowly defined passage. This results in a good damping action and a significantly enlarged frequency range.

It is known to provide the orifice of correspondingly effective connecting passages of rubber cartridge springs with a choke valve. The so formed throttle, however, is resiliently configured with respect to the flow cross section which consequently adversely affects the damping action.

In the embodiment in accordance with the invention the throttle is rigidly defined and calibrated which results in a substantially improved damping action in an optimum frequency range.

With respect to design it proved to be advantageous when the throttle in the rubber mounting in the accordance with the invention is disposed in the vicinity of the inlet or outlet of the connecting passage. It can, for example, have the form and shape of a diaphragm. It has a length of only a few millimeters and is in no case larger, preferably smaller, than the diameter resulting from the circle formula based on the surface of the cross section.

The flow cross section of the throttle can be adjusted; it is thus possible to significantly enlarge the frequency band in which good damping effects can be achieved.

It proved to be particularly advantageous when the flow cross section of the throttle can be continuously adjusted between the minimum and maximum values. The adjustability to the vibrations occurring during the intended use are thus strongly improved and straying effects have no more adverse effects toward the exterior.

For the service value of the rubber mounting in accordance with the invention it is of significant importance that the flow cross section can be adjusted very precisely to one or several precisely defined values. Considering this marginal condition it has proven itself with respect to design to provide a regulating device for the adjustment which can approach the throttle. Advantageously, the adjustment can even be improved when providing a regulating device which can be immersed into the throttle. Advantageously, an actuator is provided for the adjustment which can be activated via signals and, if necessary, be controlled by the machine element which is shielded by the rubber mounting. The actuator can be activated mechanically, electrically, pneumatically or hydraulically and, if necessary be configured as a motor operator.

The ratio of the flow cross section of the connecting passage and the one of the throttle is advantageously between 2 and 6, preferably between 3 and 4.5. The additional mounting of supplementary means for decoupling acoustically effective, high frequency vibrations is possible without problems. Corresponding means are known from German OS 27 27 244, for example.

In accordance with the invention, a rubber mounting which has a hydraulic damping device for damping vibrations of a predetermined frequency comprises working and equalization chambers joined by a connecting passage and filled with a hydraulic liquid. The connecting passage is channel-like configured and dimensioned such that when subject to vibrations of the frequency to be damped, the enclosed liquid volume resonates and that the connecting passage is narrowed to a throttle only in the area of a point which is narrowly defined in axial direction.

For a better understanding of the invention, together with other and further objects thereof, reference is made to the following description, taken in connection with the accompanying drawings, and its scope will be pointed out in the appended claims.

Referring now to the drawings:

FIG. 1b is a sectional view of the FIG. 1a embodiment, taken along line A—A of FIG. 1a;

Figure 2:
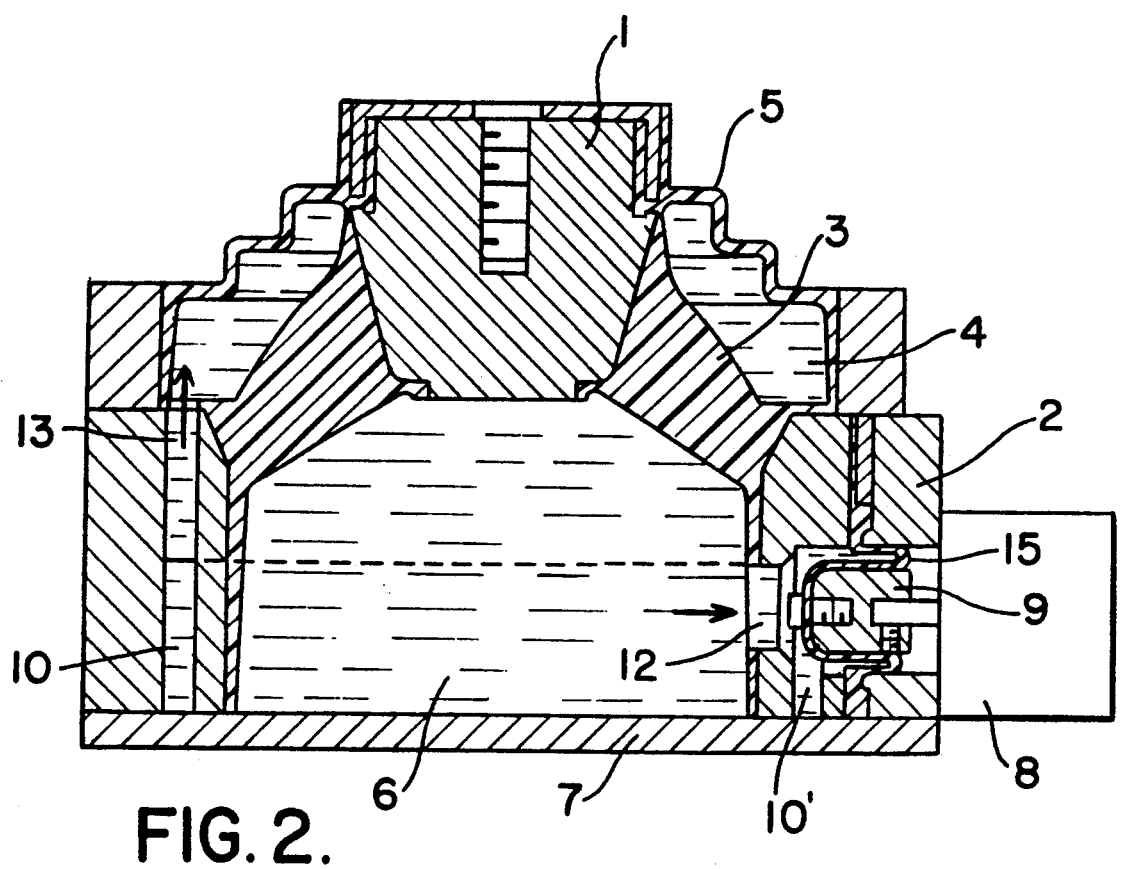
Figure 3:
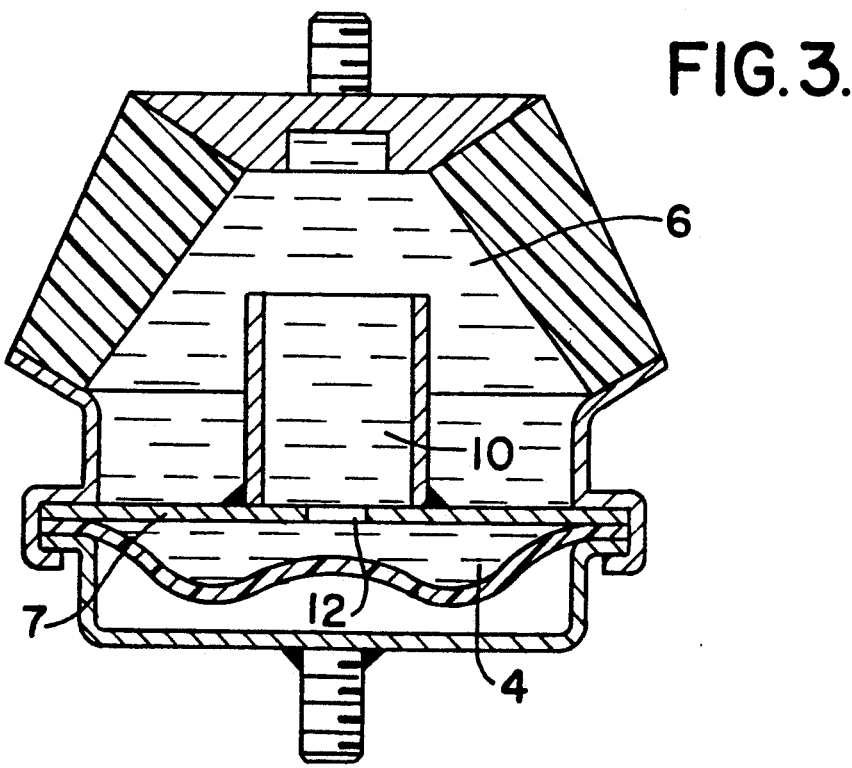

FIG. 2 is a semi-cross-sectional view of a second embodiment of the rubber mounting in accordance with the invention wherein the flow cross section of the throttle narrowing the channel-like configured connecting passage can be changed and calibrated from the exterior as desired by means of a regulating device; and FIG. 3 is a semi-cross-sectional view of a third embodiment of the rubber mounting in accordance with the invention wherein the connecting passage and the throttle are of a particularly simple design.

Referring now more particularly to the drawings, the rubber mountings represented in FIGS. 1a to 3 are particularly suited for supporting an internal combustion engine in a vehicle.

Basically, they include the support bearing 1 and the bearing 2 both of which are resiliently supported on one another through the hollow conical bearing spring 3 made of a rubber elastic material; together with the bottom plate 7 which is attached to the bearing 2, they define the working chamber 6. The latter is filled with a hydraulic liquid, for example, a mixture of glycol and water and connected to the equalization chamber 4 by means of a channel-like configured connecting passage 10. Toward the exterior this equalization chamber is defined by a flexible wall 5 and it is suitable for the pressureless reception of additional amounts of liquid. This avoids a pressure increase in the working chamber 6 caused when the load to be supported is applied during the intended use. The use of an elastically resilient defining wall is also possible.

The ratio of the flow cross section and the length of the connecting passage 10 is adjusted to match the swell elasticity of the bearing spring 3 such that when vibrations of the frequency range to be damped occur, the liquid contained in the connecting passage 10 between the orifices on both sides is made to resonate. This results in a high-performance damping covering a broad band of the corresponding vibrations.

The vibrations to be damped can be determined as required. In the aforesaid field of application, it preferably comprises a frequency range between 5 and 25 Hz.

Figure 1A:
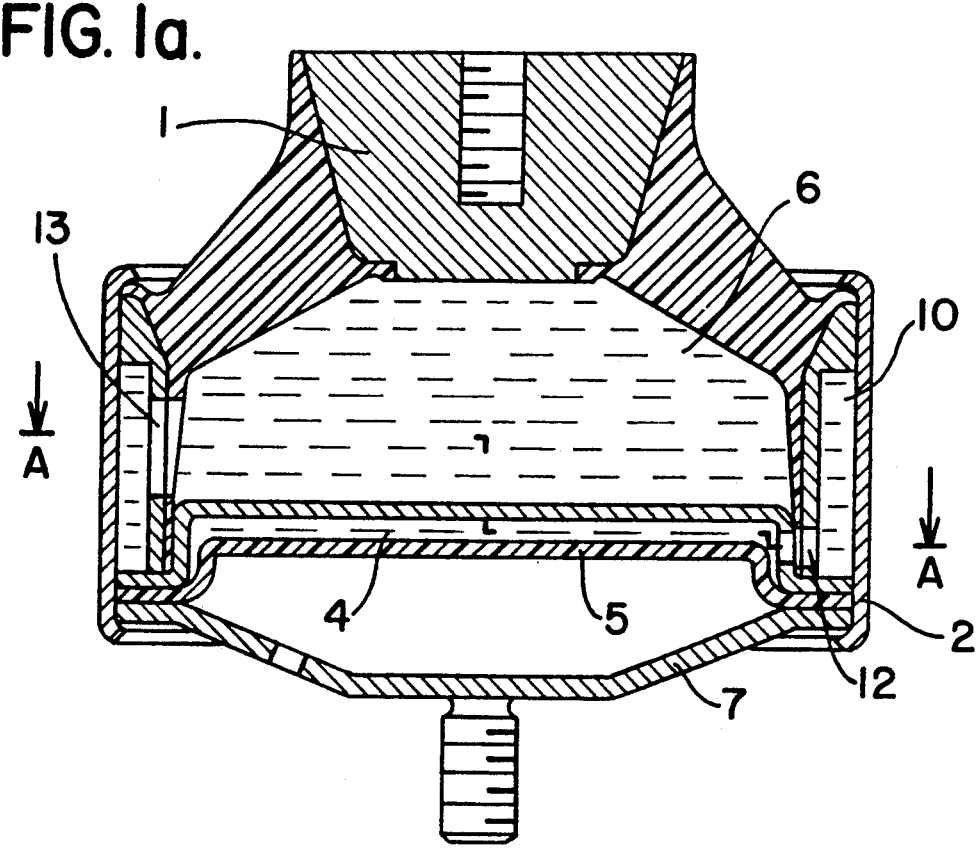
FIG. 1a is a semi-cross-sectional view of a first embodiment of the rubber mounting in accordance with the invention wherein the flow cross section of the channel-like configured connecting passage is narrowed at one point by means of a diaphragm so as to form a throttle.
Figure 1B:
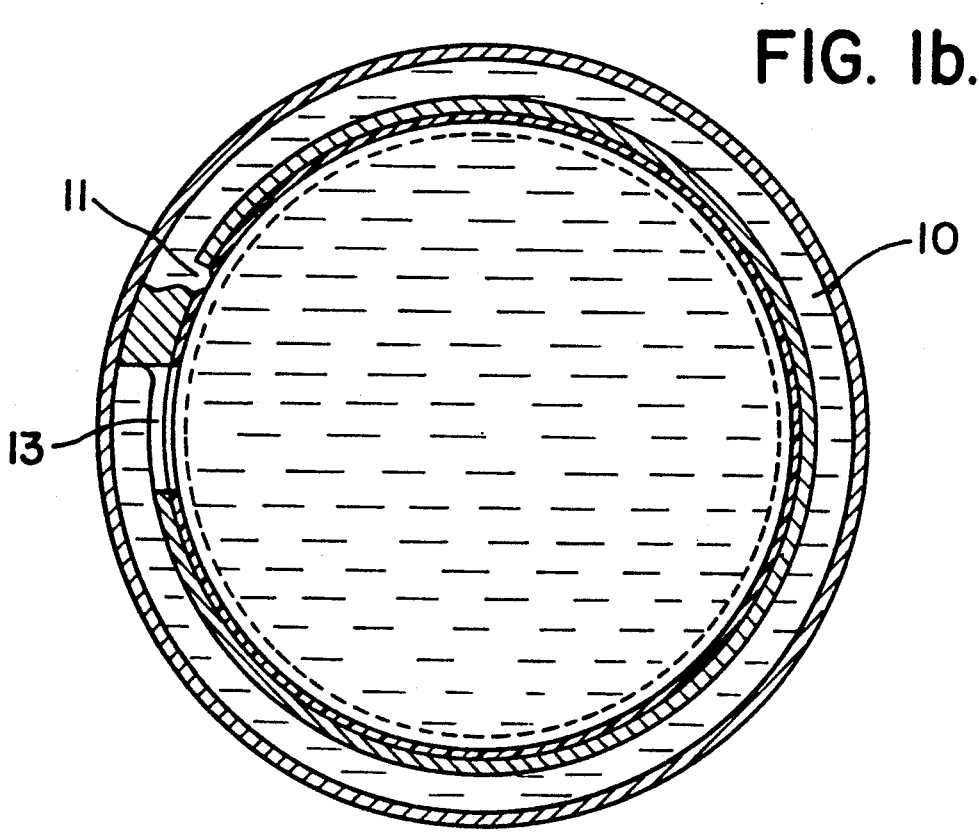

In the embodiment of FIGS. 1a and 1b the channel-like configured part of the connecting passage 10 is basically disposed radially outside the working chamber 6 and the equalization chamber 4 and it is defined by unyielding walls of the bearing 2. It is of a rectangular shape and in the area of both ends it is radially open in direction toward the working chamber 6, on the one side, and, on the other side, in direction toward the equalization chamber 4.

The flow cross section 13 in direction toward the working chamber 6 is basically identical with the flow cross section of the connecting passage 10. The liquid exchange between the connecting passage 10 and the working chamber 6 is thus basically not inhibited when the support bearing 1 is exposed to vibrations. As represented in FIG. 1b a throttle 11 preferably is included.

As opposed to this, a diaphragm-like configured, rigidly defined throttle 12 is provided in the intermediate zone between the other end of the connecting passage 10 and the equalization chamber 4. This throttle 12 has flow cross section which is approximately 0.25 to 0.33 times the size of the flow cross section of the connecting passage 10. In addition to the damping action based on the resonant effects, this results in a supplementary damping effect which is used in accordance with the invention and through which is attained the excellent damping effect in the entire aforesaid frequency range. In this case, it is of particular significance that the embodiment shown is comparatively simple and can be manufactured correspondingly inexpensively.

The embodiment of FIG. 2 is distinguished from the aforesaid basically by a modified association of equalization chamber 4 with working chamber 6 as well as the presence of a throttle 12. The flow cross section of the latter can be adjusted continuously as required between minimum and maximum valves and, if necessary, as a function of secondary marginal conditions.

The equalization chamber 4 of the embodiment of FIG. 2 is disposed radially at the outside of the bearing spring 3 and defined toward the exterior by a bellows-type resilient wall made of a synthetic rubber material. The elastic resilience of the defining wall is so small that it can be ignored which renders the equalization chamber suitable for the pressureless reception of additional amounts of liquid as it is the case in the aforesaid embodiment.

Similarly to the aforesaid embodiment, the connecting passage 10' is partially led around the working chamber 6 and is of a rectangular profile. On the one side, it is unyieldingly defined by the components of the bearing 2 and, on the other side, by components of the bottom plate 7 and in the vicinity of one end, it is axially open in direction toward the working chamber 6.

The throttle 12 is provided in the area of the overflow aperture between the connecting passage 10' and the working chamber 6. The flow cross section thereof can be adjusted or calibrated by means of the regulating device 9 which becomes increasingly narrow in the area of its front end and which can be immersed into the throttle in a defined way.

In order to carry out a corresponding displacement of the regulating device 9, an actuator 8 is provided in the embodiment according to FIG. 2 which can be activated via signals. In more simple applications, it is possible to omit the signal-controlled activation. In this case the motor operator can be replaced by a manual regulating device, for example, an adjusting screw which is provided with a front nozzle needle which is pointed at its front and can be immersed into the throttle 12.

In the embodiment of FIG. 2 a roller membrane 15 is provided for statically sealing the regulating device 9 with respect to the bearing 2; this membrane completely covers the regulating device in the center portion and at the marginal area it is liquid-tight and immovably attached to the bearing 2. It is made of a rubber-elastic material.

The embodiment shown in FIG. 3 is similar to the embodiment of FIG. 1 with regard to design and function. The connecting passage, however, is enclosed by a tube which is vertically associated with the bottom plate 7 and which mirror-invertedly encloses the throttle 12 formed by a borehole and penetrates the bottom plate 7.

While there have been described what are at present considered to s be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A rubber mounting which has a hydraulic damping device for damping vibrations of a predetermined frequency and which has an axial direction comprising: working and equalization chambers joined by a connecting passage and filled with a hydraulic liquid, the working chamber being limited by an elastomeric member, the connecting passage being channel-like configured and dimensioned such that when subject to vibrations of the frequency to be damped, the enclosed liquid volume resonates and that the connecting passage is narrowed to a throttle only in the area of a point which has a throttle flow cross section and which has a throttle length in the axial direction, the length being smaller than a diameter d resulting from a circle formula $\pi n^2/4$ based on the surface of the throttle flow cross section, the connecting passage having a flow cross section and the ratio of the flow cross section of the connecting passage and the flow cross section of the throttle being between 2:1 and 6:1.

2. A rubber mounting in accordance with claim 1, in which the throttle is in an area of an inlet and outlet of the connecting passage.

3. A rubber mounting in accordance with claim 1, in which the throttle is configured as a diaphragm.

4. A rubber mounting in accordance with claim 1, which includes a regulating device and in which the throttle is adjustable with respect to its flow cross section by means of the regulating device.

5. A rubber mounting in accordance with claim 4, which includes a regulating device for the calibrating and in which the regulating device has a front end which can approach the throttle.

6. A rubber mounting in accordance with claim 4, which includes a regulating device for the calibration and in which the regulating device has a front end which can be immersed into the throttle.

7. A rubber mounting in accordance with claim 4, which includes an actuator to carry out the adjustment and that the actuator is activated via signals.

8. A rubber mounting in accordance with claim 1, which includes a regulating device and in which the throttle has a flow cross section which can be continuously calibrated between a minimum and a maximum value by means of the regulating device.

* * * * *

UNITED STATES PATENT AND TRADEMARK OFFICE
CERTIFICATE OF CORRECTION

PATENT NO. : 5,085,413

DATED : February 4, 1992

INVENTOR(S) : Freudenberg et al.

It is certified that error appears in the above-identified patent and that said Letters Patent is hereby corrected as shown below:

Column 4, lines 53-54 for "to s be the" read

-- to be the --.

Column 5, line 6 for "$\pi m^2/4$" read

-- $\pi d^2/4$ --.

Signed and Sealed this

Twenty-first Day of December, 1993

Attest:

BRUCE LEHMAN

Attesting Officer

Commissioner of Patents and Trademarks